United States Patent [19]

Ohlig et al.

[11] 3,830,584
[45] Aug. 20, 1974

[54] TURRET SYSTEM FOR MACHINE TOOL

[75] Inventors: Karl P. Ohlig, Wauconda; Francis E. Heiberger, Elmhurst, both of Ill.

[73] Assignee: Onsrud Machine Works, Inc., Niles, Ill.

[22] Filed: Dec. 22, 1972

[21] Appl. No.: 317,367

[52] U.S. Cl.......................... 408/35, 29/40, 29/48.5
[51] Int. Cl.......................... B23b 3/16, B23b 7/04
[58] Field of Search ................. 29/48.5, 40; 408/35

[56] References Cited
UNITED STATES PATENTS

| | | | |
|---|---|---|---|
| 2,956,454 | 10/1960 | Hansen | 408/35 X |
| 3,191,260 | 6/1965 | Jorgensen | 408/35 |
| 3,473,419 | 10/1969 | Ollearo | 408/35 |
| 3,653,282 | 4/1972 | Bouffiou et al. | 408/35 X |

*Primary Examiner*—Harrison L. Hinson
*Attorney, Agent, or Firm*—Wolfe, Hubbard, Leydig, Voit & Osann, Ltd.

[57] ABSTRACT

A turret system for a machine tool consisting of a positionable frame mounting a rotary turret having spindle assemblies in spaced stations and in which means are provided for driving the spindle in the active station. A reversible turret driving motor is provided with control means for causing any selected turret station to be rotated around into active machining position with continuous and uninterrupted motion and via the shortest path of movement thereby to minimize the time which is normally wasted between successive machining steps. Means are provided for insuring accurate positioning with a novel arrangement of interlocks to achieve safe and rapid sequencing. Each spindle is of hollow construction having a chuck including an inwardly biased pull rod for seating a tool in working position. An actuator at a reference tool-changing position releases the chuck for substitution of a different tool.

20 Claims, 21 Drawing Figures

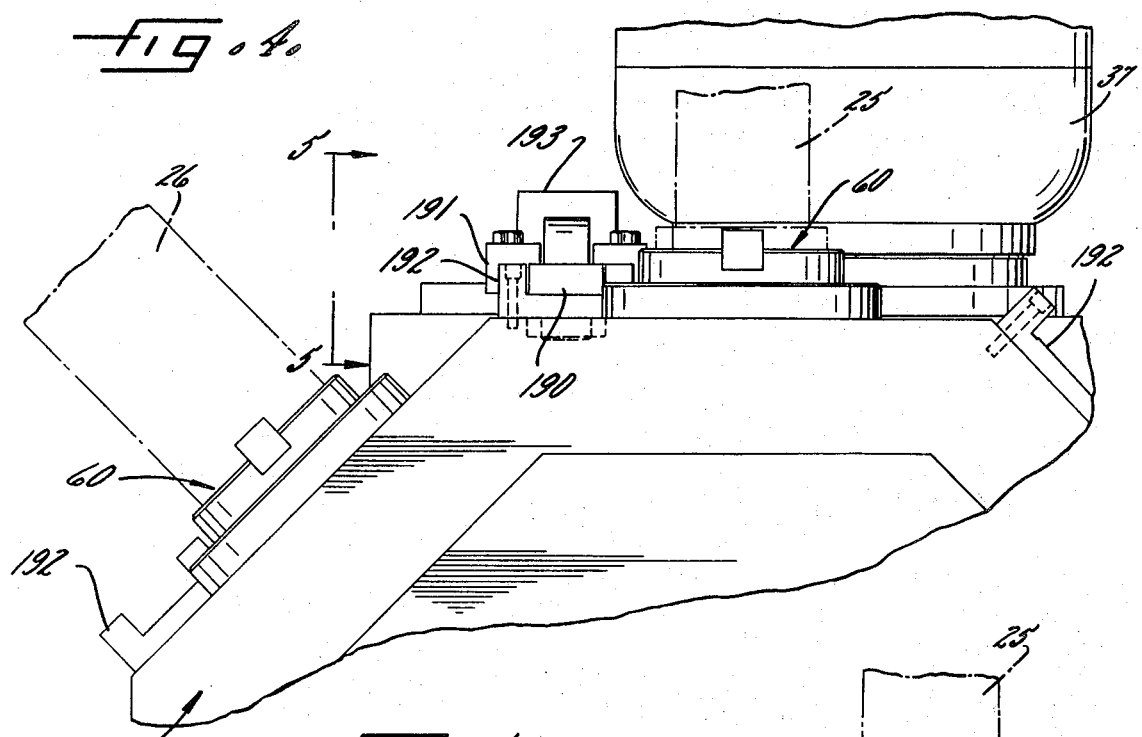
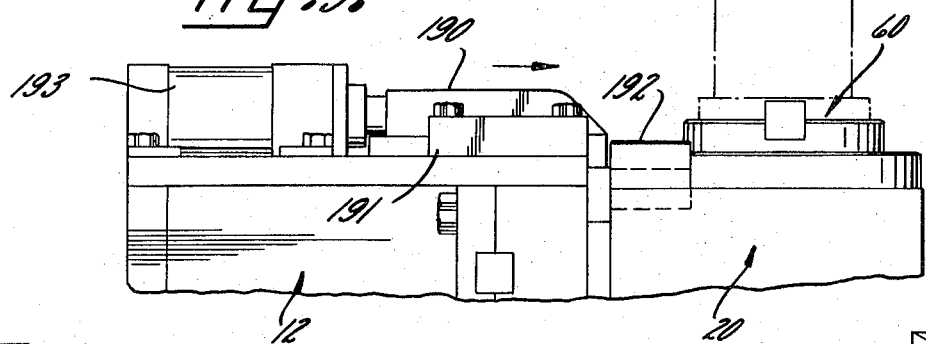
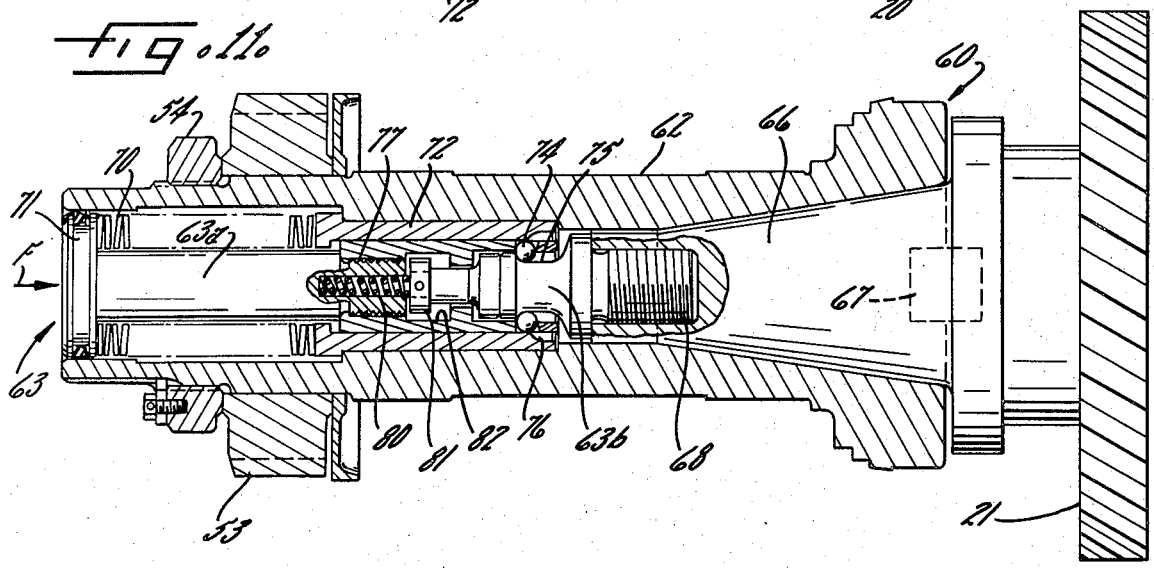

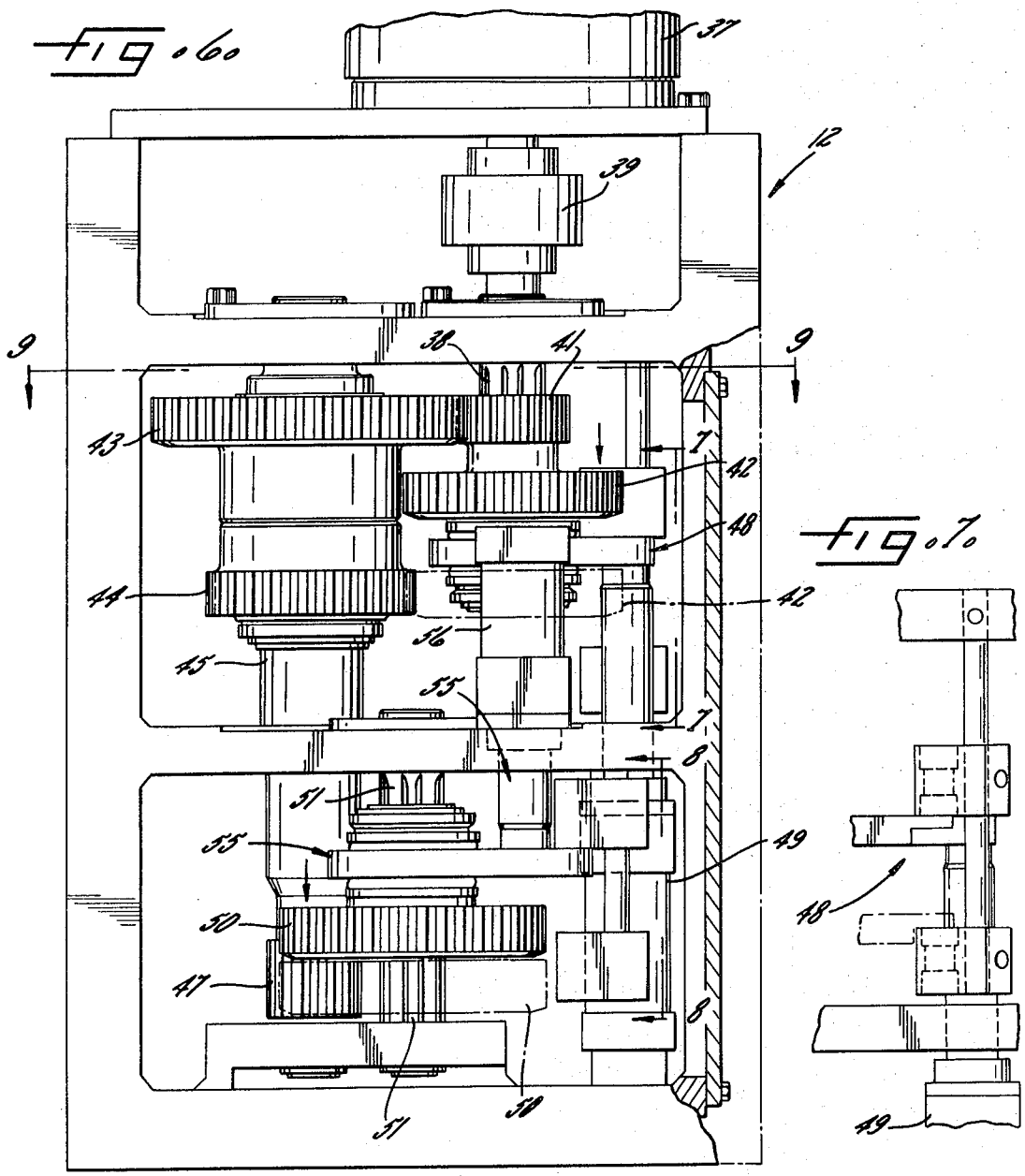

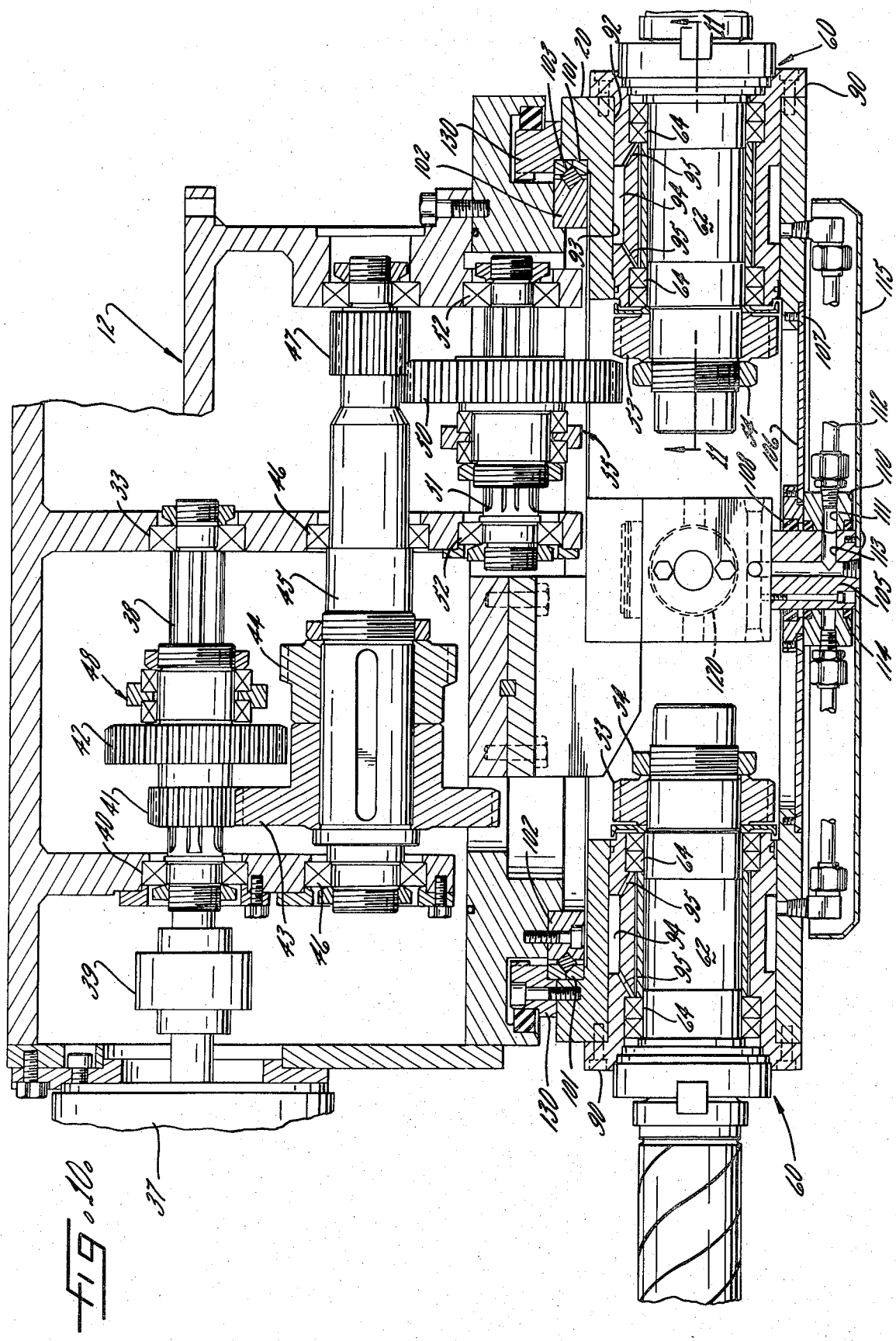

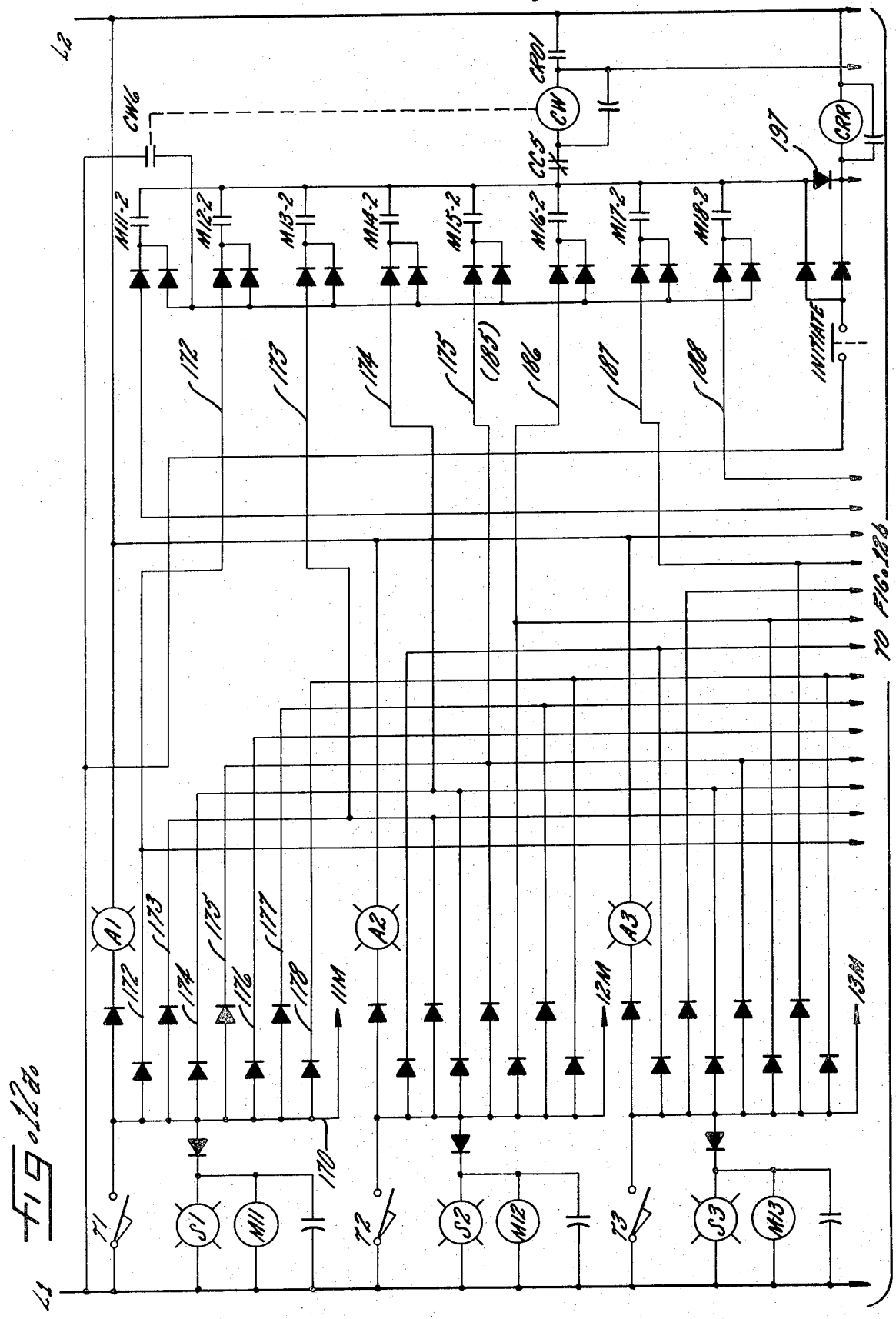

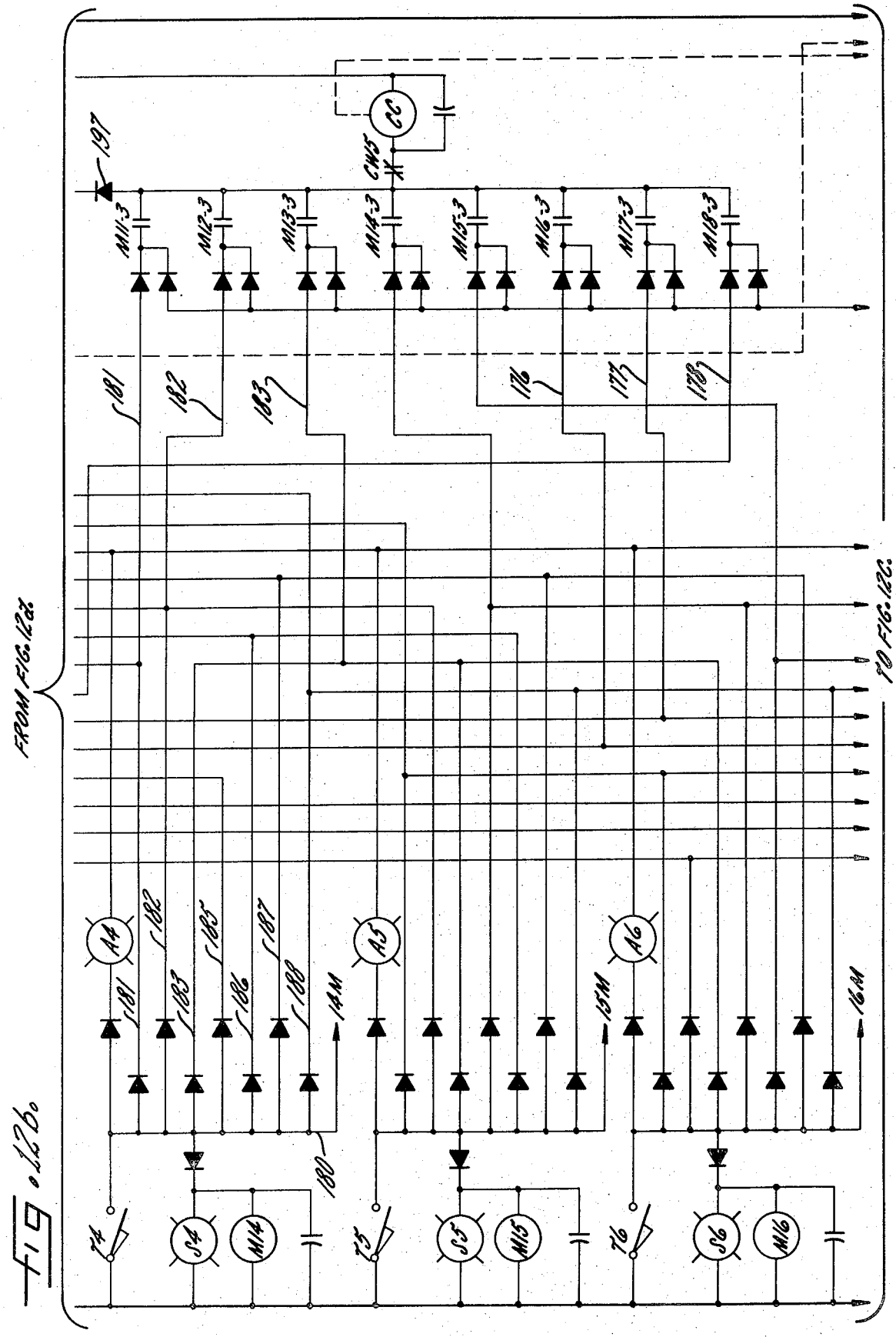

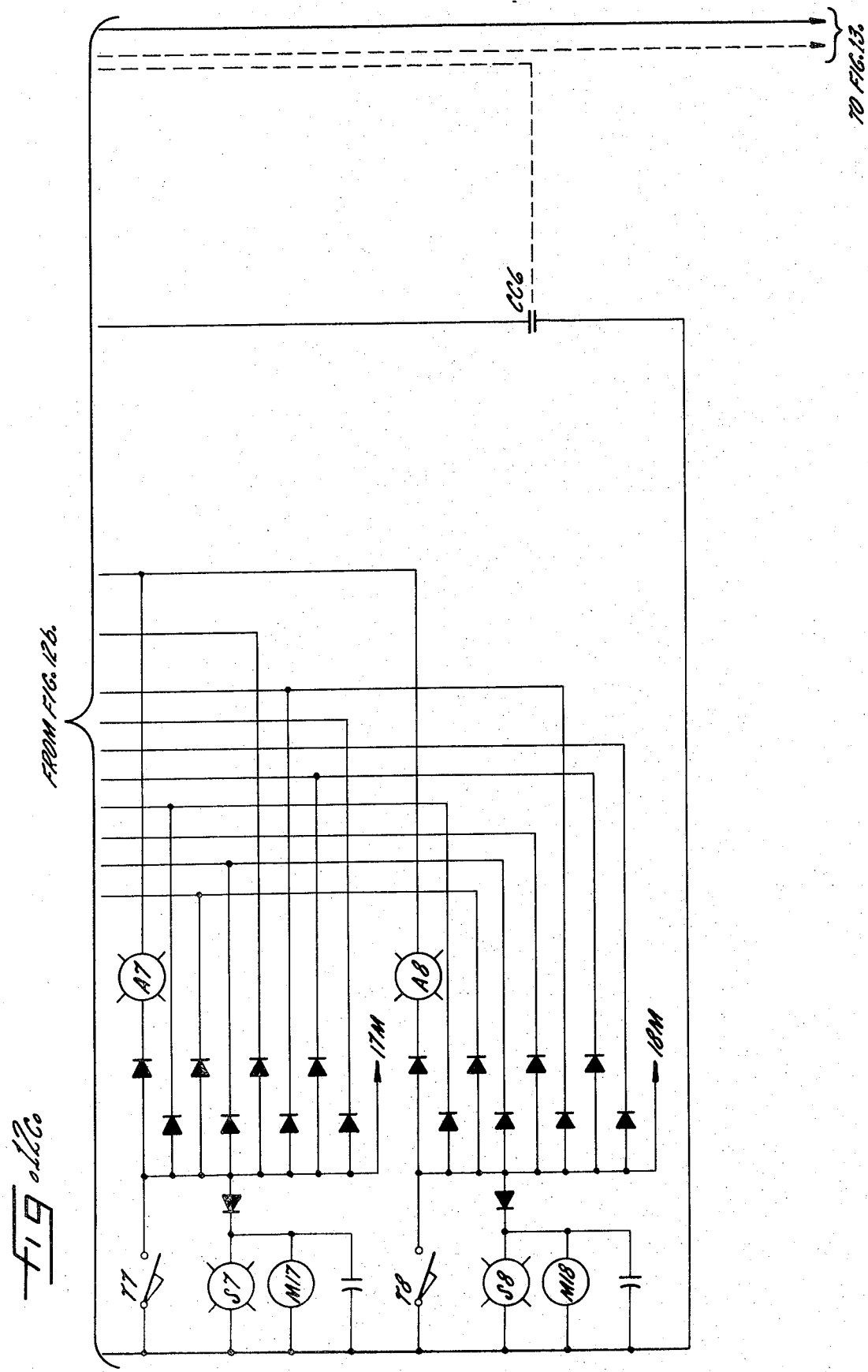

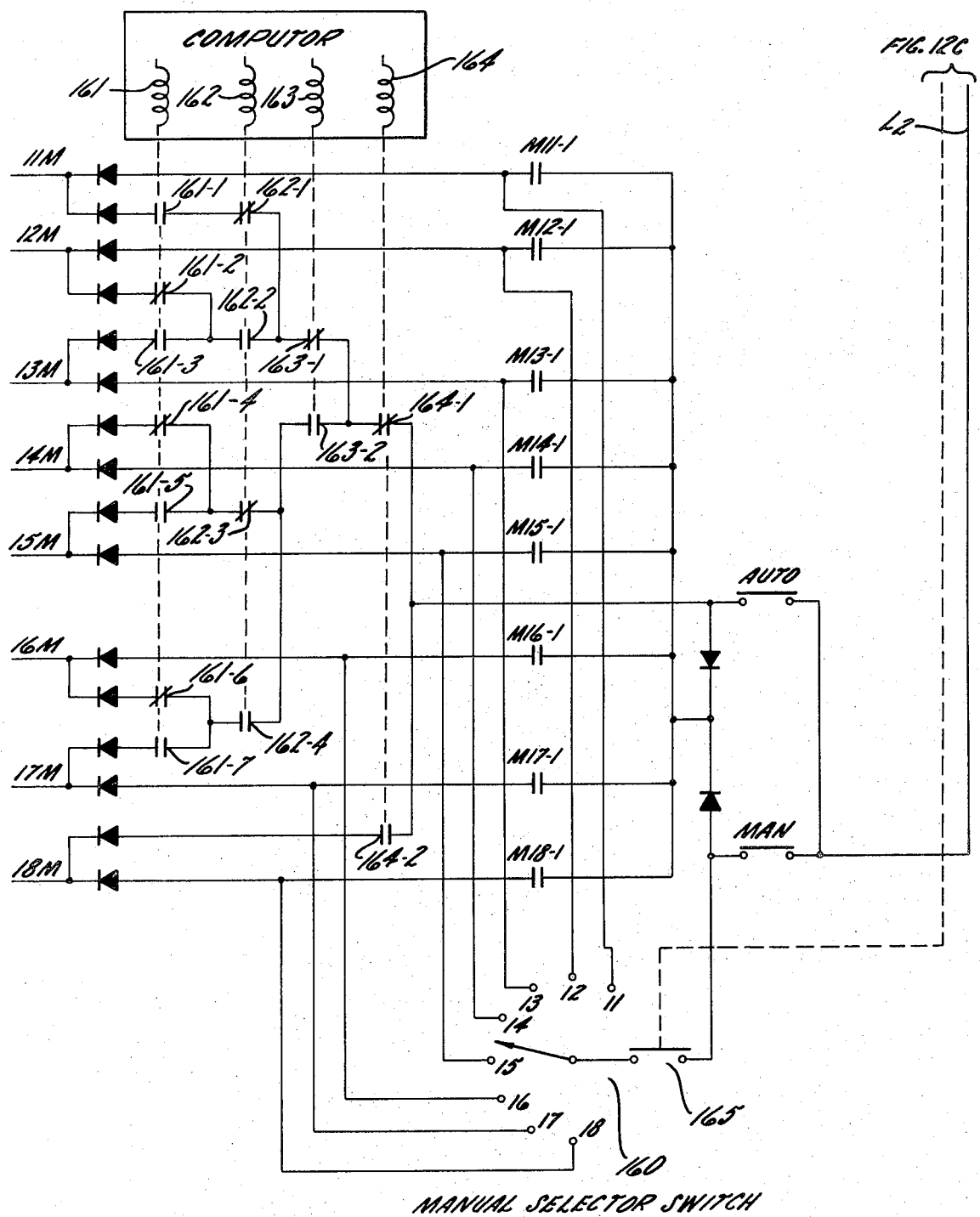

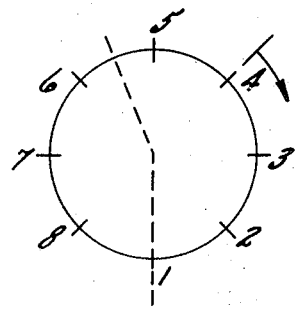
Fig. 15a.
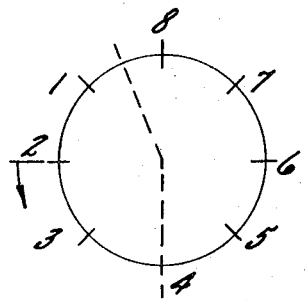
Fig. 15b.
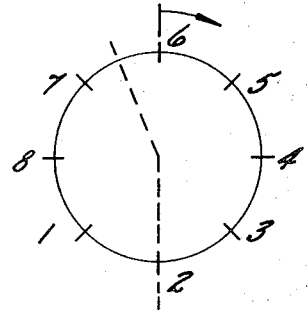
Fig. 15c.
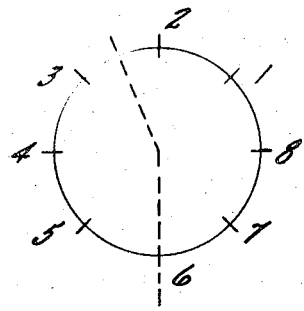
Fig. 15d.
Fig. 16.

TURRET SYSTEM FOR MACHINE TOOL

It is an object of the invention to provide a turret system for a machine tool which is capable of performing a plurality of operations upon a workpiece in quick succession with minimum lost time and without necessity for the step by step indexing movement employed in automatic sequencing turrets of conventional design.

It is another object of the invention to provide a turret system which is capable of positioning tools in a selected sequence at an active machining position and which is capable of locating each of the selected tools with a high degree of reproducible precision.

It is more specifically an object of the present invention to provide a control arrangement for a turret which employs novel logic circuitry for securing a continuous stroke of turret rotation, either clockwise or counterclockwise, along the shortest possible path in bringing each of a series of selected tools into active machining position regardless of the order in which the tools are used.

Other objects and advantages of the invention will become apparent upon reading the attached detailed description and upon reference to the drawings in which:

FIG. 4 is an enlarged fragment of FIG. 1 showing the shot pin assembly.

FIG. 5 is a fragmentary side view of the shot pin assembly looking along line 5—5 in FIG. 4.

FIG. 6 is a top view of the spindle drive assembly.

FIG. 7 is a fragmentary view of a shift assembly looking along the line 7—7 in FIG. 6.

FIG. 8 is a similar view looking along the line 8—8 in FIG. 6.

FIG. 10 is a developed section taken along the line 10—10 in FIG. 9.

FIG. 11 shows the cross section of a typical spindle assembly looking along the line 11—11 in FIG. 10.

Figure 1:
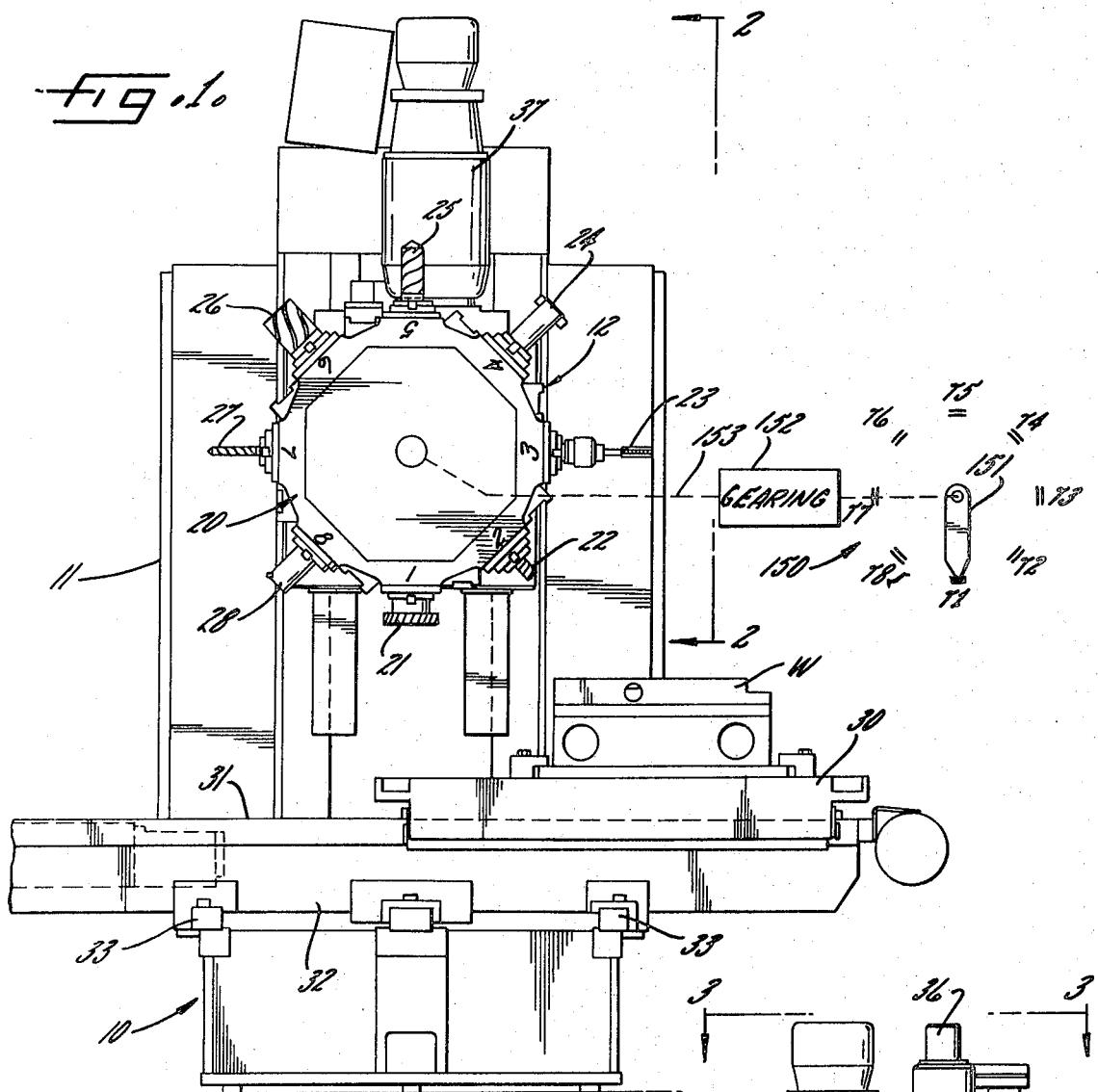
FIG. 1 is a front elevational view of a machine tool employing a turret system of present design.
Figure 3:
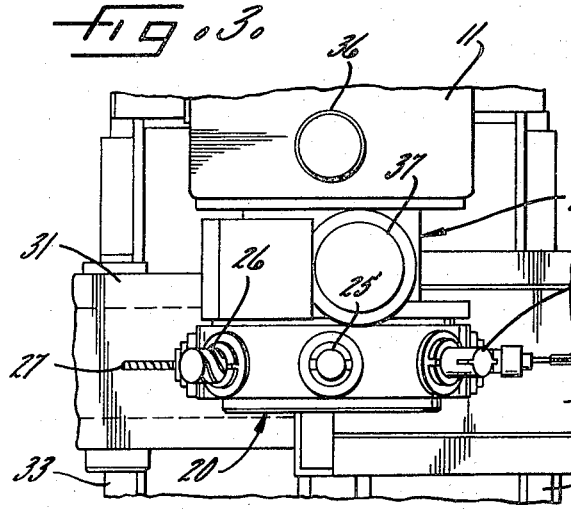
FIG. 3 is a top view of the machine tool looking along line 3—3 in FIG. 2.
Figure 2:
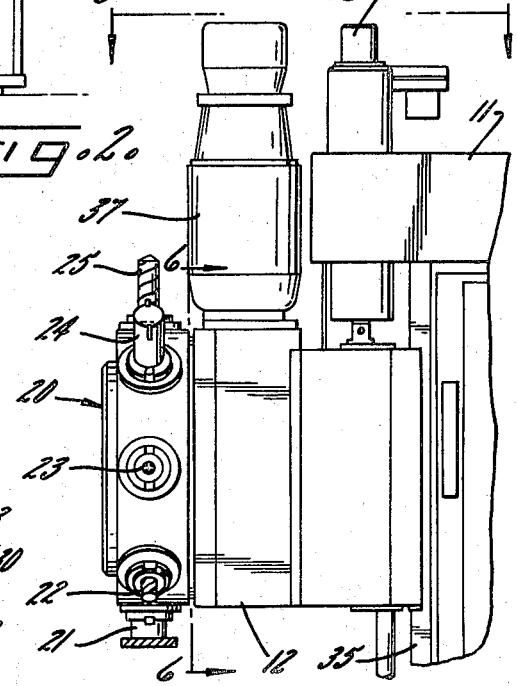
FIG. 2 is a fragmentary elevation looking along the line 2—2 in FIG. 1.

FIGS. 12a–12c, taken together, comprise a schematic diagram of the logic circuitry.

FIG. 13 shows the selector sub-circuit permitting either manual or computer selection.

FIG. 14 is a schematic diagram showing the circuitry for the turret motor and shot pin.

FIGS. 15a–15d are a set of stop motion diagrams illustrating typical sequential movements of the turret.

FIG. 16 is a diagram summarizing the logic embodied in FIGS. 12a–12c.

While the invention has been described in connection with a preferred embodiment, it will be understood that we do not intend to be limited to the particular embodiment shown but intend, on the contrary, to cover the various alternative and equivalent constructions included within the spirit and scope of the appended claims.

Turning to the drawings there is disclosed in FIGS. 1 to 10 (see especially FIG. 1) a machine tool having a main frame 10 including an upright portion 11 upon which is mounted a turret frame 12 mounting a turret 20. In the present embodiment the turret is mounted for rotation about a horizontal axis but it will be apparent as the discussion proceeds that the turret system which forms the substance of the invention does not require the turret to be oriented in any particular position. The turret has a total of eight stations as indicated by the numbers 1–8 in FIG. 1 having tools 21–28 respectively.

For cooperating with the tool which is in active machining position, here tool 21, a workpiece W is mounted upon a table 30 which is slidably mounted upon a first set of horizontal ways 31 forming a part of a carriage 32. The carriage is in turn mounted upon a transversely extending set of horizontal ways 33. Vertical movement of the selected tool with respect to the workpiece is brought about by mounting the turret frame 12 upon vertically extending turret way surfaces 35. The frame 12 is adjusted by a jackscrew mechanism, not shown, driven by a motor 36. Thus, relative movement between tool and workpiece is possible along all three of the rectangular axes and such movements may, if desired, be computer controlled.

Figure 9:
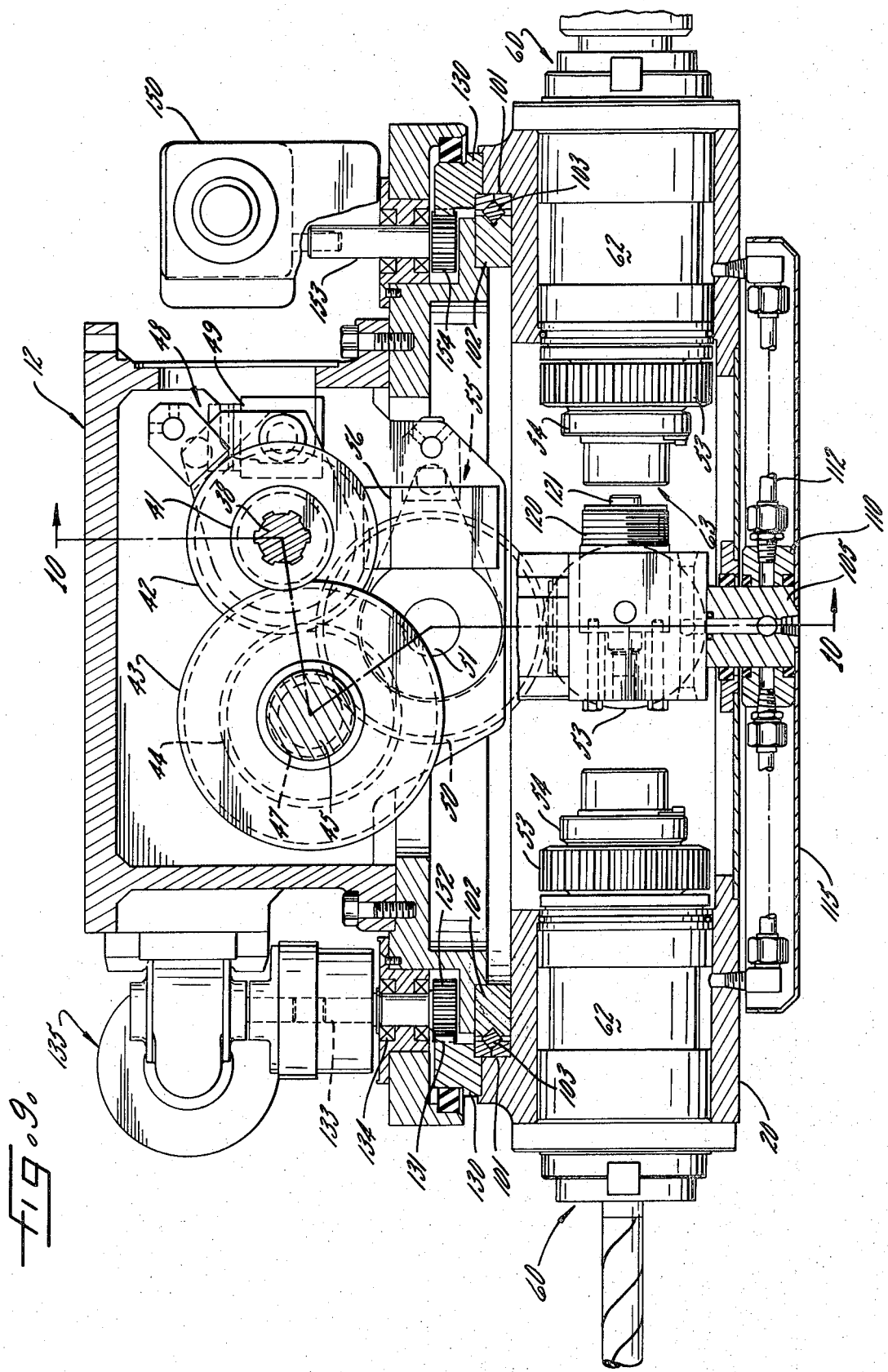
FIG. 9 is a cross section looking along the line 9—9 in FIG. 6.
Figure 24:
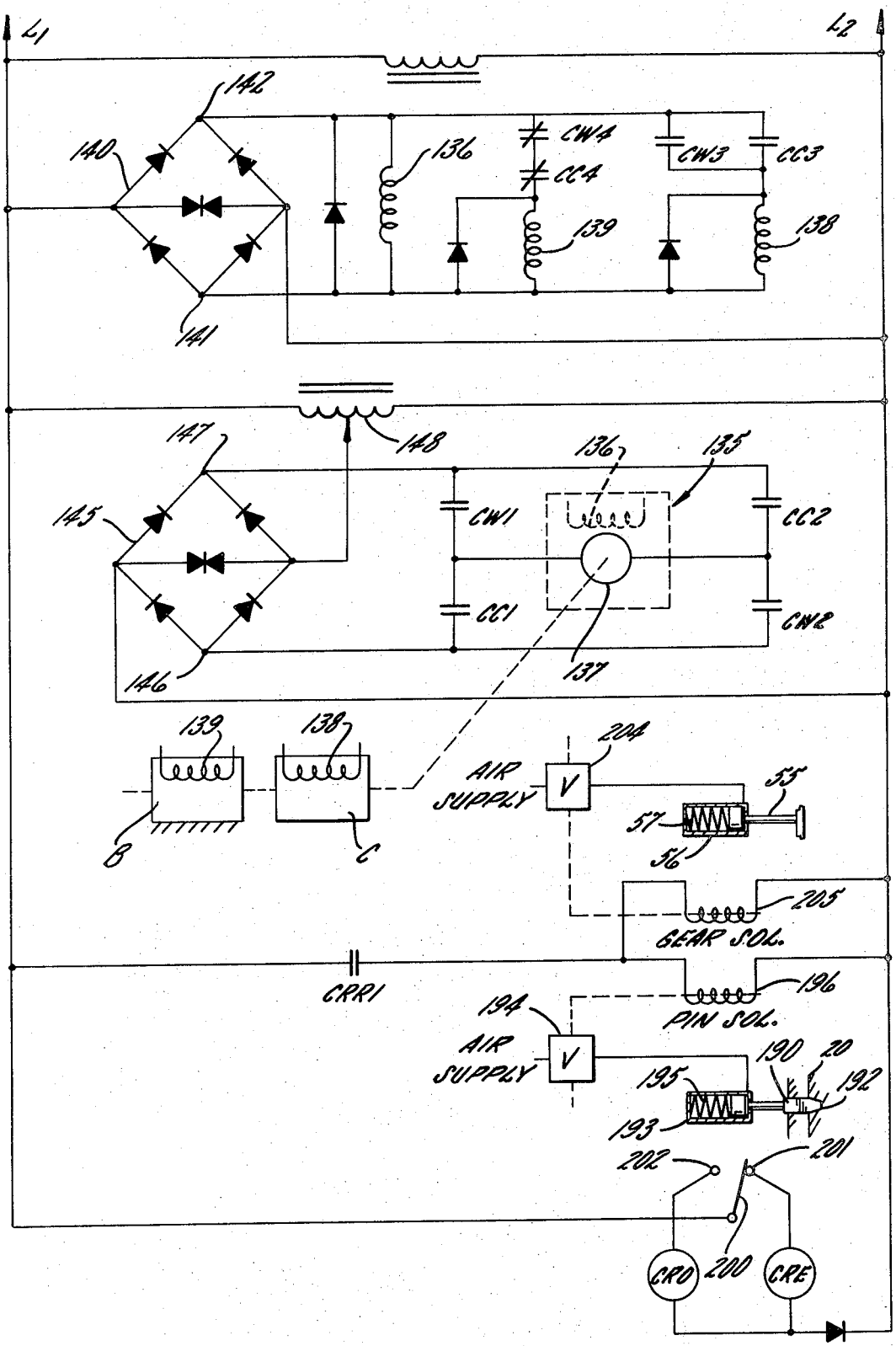

To understand the mechanism for driving a selected one of the tools, attention is particularly directed to FIGS. 9 and 10. Rotary motion is obtained from a spindle drive motor 37 which is mounted at the top of the turret frame 12 and which is connected to a shaft 38 via a flexible coupling 39, the shaft being mounted in bearings 40. Splined upon the shaft 38 is a first gear set consisting of gears 41, 42. The first gear set cooperates with a second gear set consisting of gears 43, 44. The latter are mounted upon a cross shaft 45 having bearings 46 and carrying a cross shaft pinion 47 at its lower end. A shifting assembly generally indicated at 48 having an actuator 49 serves to shift the first gear set along the splined shaft 38 from a first, illustrated, position in which the gears 41, 43 are in engagement to an alternate position in which the gears 42, 44 engage one another. The shifting of the gears thus provides different driving ratios to provide a more nearly optimum driving speed for the selected tool.

Running in mesh with the pinion 47 on the shaft 45 is a drive gear 50 mounted upon a drive shaft 51 having bearings 52. Alined with the gear 50 is a pinion 53 which forms the driven element of the tool spindle and which is held by a nut 54. The position of the driving gear 50 thus determines the active machining position of a selected tool spindle. For the purpose of shifting the driving gear into and out of mesh with respect to the pinion 53, a shifting mechanism 55 is provided. To insure that the gear and pinion are engaged smoothly even though the teeth may be in initial misalinement, the shifting mechanism 55 is operated by a pneumatic actuator 56 having a spring 57 (FIG. 14) which provides resilient thrust. Thus, if the gears are slightly out of phase, spring force in the engaging direction causes them to resiliently press against one another so that the teeth will drop into register as the drive gear 50 begins to rotate. Preferably, the pinion 47 on the cross shaft 45 is elongated so that it remains constantly in mesh with the gear 50 regardless of the shifted position of the latter.

In carrying out the present invention, separate spindle assemblies, indicated at 60 (FIG. 10) are provided at each turret station for selective driving by the drive gear 50. Each turret assembly 60, in the present embodiment, consists of three main elements. The first is an outer cylindrical sleeve 61. The second is a hollow spindle 62 (FIG. 11), and the third is a central pull rod 63 which consists of two portions 63a, 63b which are telescoped together. Interposed between the sleeve 61 and spindle 62 are bearings 64 so that the spindle is freely rotatable with the pinion 53. For chucking the tool, for example, the tool 21, to the spindle 62, the tool is provided with a tapered shank 66 drivingly engaged by a key 67 mounted on the spindle. The inner end of the shank 66 has a threaded connection with the part 63b of the pull rod as indicated at 68.

To draw the pull rod 63 inwardly, the pull rod is encircled by a strong spring 70 which bears against a disc or flange 71 at the extreme inner (left hand) end of the pull rod. At its opposite end the spring 70 is seated against an auxiliary sleeve 72.

For the purpose of latching the two portions 63a, 63b of the pull rod together, a latch is provided in the form of a row of balls 74 which normally register with a necked-down region 75 of the portion 63b of the pull rod. The auxiliary sleeve 72 is of such thickness that when the pull rod is in its normal working position the balls 74 are held in place. But the auxiliary sleeve has a clearance space 76 into which the balls 74 may move for unlatching purposes as will appear. The portion 63a of the pull rod for convenience is made up of two pieces threaded together at 77.

A light spring indicated at 80 is provided between the sections 63a, 63b of the pull rod to bias them apart, with the relative motion being limited by a collar 81 movable in a clearance space 82.

In operation the shank 66 of the tool is held tightly in the spindle with driving force being transmitted by the key 67. When it is desired to release the tool a thrust F is applied to the disc 71 at the inner end of the pull rod causing the pull rod to telescope bodily outward accompanied by compression of the spring 70. Initial movement serves to unseat the shank of the tool and continued movement brings the balls 74 into alinement with the clearance space 76, permitting the balls to move radially and thereby unlatching the portion 63b of the pull rod. With the latter thus free to move, it, together with the tool, pops outwardly under the urging of the light spring 80. This outward movement disengages the key 67 from the tool thereby permitting the shank 66 to be rotated to unscrew the thread 68. A completely different tool may then be screwed in place.

With the new tool in register with the key 67, it is pressed inwardly thereby compressing the light spring 80 to bring the region of clearance 75 into register with the balls 74 so that the balls may drop back into latching position. Release of the thrust F then permits the pull rod to move bodily back into its initial position illustrated in FIG. 11.

In order to permit the spindle assembly 60 to be removed for inspection or servicing, the sleeve portion 61 thereof has a flange 90 which is held in place by a circle of bolts 91. The sleeve has a cylindrical outer surface 92 which is dimensioned to fit snugly in a cylindrical receptacle 93 which is radially formed in the turret 20. The diameter of the pinion 53 is just slightly less than the inner diameter of the receptacle so that the spindle may be pulled endwise without obstruction.

For the purpose of lubricating the spindle assembly 60, the sleeve 61 is sealed in its receptacle and has an annular recess 94 which communicates with longitudinal passageways 95 leading to the spindle bearings 64. Lubricant is supplied under pressure to the annular space 94 by means to be described.

For the purpose of mounting the turret 20 for rotation upon the frame 12, the turret and frame have registered annular surfaces indicated at 101, 102, respectively, with an annular way, or bearing, assembly 103 interposed between them. Moreover, the frame 20 is provided with a central post 105. The post, which is stationary, is surrounded by an annular turret plate 106 which is secured to the turret by screws 107 and which has a central seal 108.

In carrying out the invention means are provided for furnishing lubricant, under pressure, to that spindle assembly 60 which occupies the active position. For this purpose the central post 105 has, telescoped over it, a commutation ring 110 having a plurality of receiving ports 111 communicating with radial distribution lines 112 leading to the respective spindles. The post 105 is formed with an outlet port 113 which is alined with the active spindle position. A seal 114 interposed between the commutation ring and the post prevents leakage. Any suitable lubricant supply arrangement may be provided to furnish lubricant to the distribution port 113. An octagonal shield 115 mounted on post 105 serves to conceal the lines 112.

It will be apparent, then, that with a spindle assembly 60 in active machining position, port 113 in alined position with the receiving opening 111 transmits lubricant through line 112 into the annular space 94, with the lubricant then flowing through the passages 95 to the bearings 64. In this way only the spindle assembly which is in the active position is connected to the source of lubricant.

For the purpose of providing a thrust F to actuate the pull rod 63 for substitution of a different tool in a given spindle assembly, an hydraulic actuator is provided which is preferably located at a reference position integrally related to the active machining position. When a total of eight stations are provided on the turret the actuator may, for example, be located at 90°, which is twice the interval between adjacent stations. Turning to FIG. 9, the actuator, indicated at 120, is stationarily secured to the central post 105, presenting a plunger 121. It will be apparent then that when the plunger 121 is extended the spindle assembly which is in the reference tool-changing position is engaged to force the pull rod of the assembly outwardly for tool removal as has been previously described. The actuator may be furnished with pressure fluid from any suitable source.

Turning next to the means for rotating the turret 20 reference is made to FIGS. 9 and 10 where it will be noted that the turret has a ring gear, or circular rack, 130, with inwardly facing teeth 131 engaged by a drive pinion 132 on a shaft 133 which is parallel to the turret axis. The shaft 133 is mounted in bearings 134 and driven by a gear motor 135. It will be understood that the gear motor 135 is per se a well known type having a motor M with a close coupled clutch C and brake B (FIG. 14). The motor has a field winding 136 and an armature 137 while the clutch and brake have windings 138, 139, respectively. As shown in FIG. 14, motor field winding 136 receives current from a bridge rectifier 140 connected across supply lines L1, L2 and having DC output terminals 141, 142. The clutch and brake coils 138, 139 are connected across the same circuit but with series contacts to provide alternative energization.

For furnishing current to the armature 137 a second bridge rectifier 145 is provided having output terminals 146, 147. The input voltage to the rectifier is susceptible to variation by an auto transformer 148. For directing the flow of direct current to the armature 137 in one direction or the other for clockwise and counterclockwise rotation of the turret, motor control relays are provided (see FIGS. 12a, 12b) as designated at CW and CC. The relay CW has normally open contacts CW1–CW3 and normally closed contacts CC4 wired as shown in FIG. 14. Similarly, the relay CC has normally open contacts CC1–CC3 and normally closed contacts CC4. To insure that the relays CW and CC are never energized at the same time, each relay is provided with cross connected, normally closed interlock contacts CW5 and CC5. (FIG. 12a, 12b)

In operation, then, it will be apparent that when the relay CW is energized by means to be described, closure of contacts CW1–CW3 energizes the armature and clutch to produce clockwise rotation of the turret with the simultaneous opening of contact CW4 serving to deenergize the brake 139. Conversely, energization of the relay CC will produce armature rotation in the opposite direction. When neither relay is energized a circuit is completed to the brake coil 139 so that the turret is held in its existing position.

In accordance with the present invention a position sensor is provided for each of the turret stations to indicate when the turret station is in active machining position and means including a selector switch is provided for selecting a desired new turret station, the sensor and selector intelligence being fed into a logic matrix circuit which energizes the turret motor in a direction to rotate the selected station to the active machining position in a single continuous movement along the shortest of the two possible paths. The sensor at the selected station serves to turn off the turret motor when the selected station reaches the active machining position. Prior to discussing the circuitry for accomplishing this, and which is set forth in FIGS. 12a–12c, reference will be made to FIG. 1 in which the position sensors, in the form of electrical contacts, are diagrammatically illustrated. The sensing contacts are shown circularly arranged and indicated at T1–T8 inclusive. Instead of the sensing contacts being mounted upon the turret, it is more convenient to mount the contacts stationarily in a contact assembly 150 for actuation by an arm or rotor 151 which is connected via gearing 152, shaft 153 and pinion 154 (see FIG. 9) to the turret ring gear 130. The gearing 152 is of such ratio and so phased that when station 1 is in the active machining position, as shown, the position sensing contacts T1 are closed. Similarly, when the turret is rotated to bring station 2 into active position, the arm 151 leaves, contacts T1 closes the sensing contacts T2, and so on for each of the other station in the series. The selector switches T1–T8 inclusive provide part of the information fed to the logic circuit of FIGS. 12a–12c.

The other form of "input" to the logic circuit originates in the station selector which is illustrated, in the form of a subcircuit, in FIG. 13. The selector circuit has output lines which have been designated 11M–18M inclusive corresponding to selected ones of the stations 1–8, with the selector serving to apply voltage to the selected line. Selection may be made either manually or by a computer. Manual selection is accomplished by a selector switch 160 having terminals 11–18 respectively. In the case of selection by computer, the computer, indicated in block form in FIG. 13, has output relays 161–164 which serve to control the normally open and normally closed switch contacts alined therewith.

Since manual selection is the simplest mode, it will be covered first. It will be noted that the circuit to the selector switch 160 is fed through a manual mode switch and an "initiate" push button 165. When the selector switch 160 is set, say, in its first position 11, and when the push button 165 is momentarily closed, voltage is applied to the output line 11M for selection of the first turret station.

In accordance with the present invention selector relays, operated by the selector circuit output lines 11M–18M, are provided to operate relay contacts interposed in the logic circuitry and for the purpose of sustaining or "sealing in" the selector signal. Thus, we provide a series of relays M11–M18 (FIGS. 12a–12c) inclusive which are respectively operated by the lines 11M–18M and which have sealing contacts M11-1 to M18-1 (FIG. 13). As a result, when the selector switch 160 is moved to the position 11 and the momentary push button 165 is depressed, the relay M11 is energized closing sealing contacts M11-1 which serve to apply voltage directly to the line 11M without further reliance upon the push button 165, so that the push button may be released without drop-out of the relay. The same is, of course, true of all of the other positions of the selector switch 160.

For the purpose of making a turret station selection by computer, the AUTO mode switch (FIG. 13) is closed completing a circuit to line L2. Computer output relays 161–164 correspond to the first four binary orders. The correspondingly numbered contacts together comprise a logic network to provide binary-to-decimal translation. For example, when relay 161 is actuated corresponding to binary 1 in the lowest order, closure of contacts 161-1 energize selector output line 11M. Similarly, when relay 162 closes to indicate a binary 1 in the second order, which corresponds to decimal 2, contacts 162-2 close to apply voltage to the output line 12M. In this way it is possible for a computer with binary output to selectively energize any one of the selector lines. Just as in the case of manual selection, the sealing contacts M11–M18 sustain the connection so that the computer relays need be operated only momentarily. If desired, the computer relay contacts may be in the form of solid state devices.

It is one of the features of the present control circuit that each of the selector relays M11–M18 has a separate set of selector relay contacts connected in series with the relays which respectively control the forward and reverse rotation of the turret motor. Thus, referring to the righthand side of FIGS. 12a–12c, it will be noted that there is a series of normally open relay contacts M11-2 to M18-2 which are bussed together and connected to the input lead of the relay CW. As shown directly below, a set of contacts M11-3 to M18-3 on the selector relays are correspondingly connected to the input lead of the turret motor relay CC.

In accordance with the present invention the turret position sensing switches are so connected to the selector relay contacts that the turret motor is energized in a direction to turn the turret clockwise for any selected station which lies to the right of the active position and counterclockwise for any selected station which lies to the left of the active position. By way of example reference is made to FIG. 15a where it will be assumed that turret station 1 is in active machining position and that it is desired to rotate the turret to bring station 4 into the active position. In order to accomplish this with a minimum of turret rotation, station 4 lying to the right of active position, the turret is rotated clockwise. Taking a further example, as illustrated in FIG. 15b, assuming station 4 is in the active position and that station 2 is selected, since station 2 lies to the left of active station 4, turret rotation is minimized by rotating the turret counterclockwise. In the case of selection of the diametrically opposite station, the dilemma is resolved by clockwise rotation.

The manner in which this is accomplished for each of the possible existing (active) turret positions and for each of the selected new stations is set forth in charted form in FIG. 16. In this chart the station at the active position is set forth in the first column while the selected new station is set forth in the second, the information in the two columns then determining whether it is the turret motor relay CW or relay CC which is energized for minimum rotation of the turret to achieve the new position.

That the circuit shown in FIGS. 12a–12c carries out the logic charted in FIG. 16 will be apparent by referring to the example in FIG. 15a. With turret station 1 in active machining position, sensing switch T1, connected to line L1, will be closed (see also FIG. 1). This serves, in the first place, to light an indicator lamp A1 showing that station 1 is, indeed, in active position. Primarily, switch T1 energizes a "first station" bus 170 which applies voltage to lines 172–175 leading to the left-hand side of contacts M12-2 to M15-2 which serve to control relay CW which energizes the turret motor. The bus 170 also supplies voltage to lines 176–178 leading to the left-hand side of contacts M16-3 to M18-3 which serve to actuate relay CC to energize the turret motor for opposite rotation. The significance of this will be apparent upon inspection of FIG. 15a where a dotted line of demarcation separates "left" from "right." It establishes that in the event any of the stations 2, 3, 4 or 5 are selected the turret is predisposed to rotate clockwise, whereas if stations 6, 7 or 8 are selected the turret is predisposed to rotate counterclockwise. As yet, however, no rotation takes place since none of the selector relays has been energized.

Let it be assumed, in accordance with the example in 15a, that station 4 is the selected station and that contacts CRO-1 (to which reference will be made) are closed. Selection may either be made by closure of contact 14 of the selector switch 160, accompanied by closure of push button 165, or may be made by energization of relay 163 within the computer. If the latter, contacts 163-2 are closed so that voltage is applied from line L2 to the line 14M to produce energization of selector relay M14 and lighting of the indicator lamp S4 which is in parallel with it. Both the relay and lamp are sealed in via contacts M14-1. Closure of the relay closes contacts M14-2 and M14-3. Closure of the contacts M14-3 occurs idly. However, closure of contact M14-2 results in completion of a circuit to the relay CW. Closure of such relay, in turn, closes contacts CW1–CW3 and opening of contacts CW4. This releases the brake 139, engages the clutch 138, and produces rotation of the armature 137 of the turret motor in the clockwise turret direction.

Simultaneously, normally closed contacts CW5, which are in series with the relay CC, are opened so as to preclude concurrent operation of the relay CC.

In order that movement of the turret might be sustained even after the turret leaves the initially active position, that is, to insure sustained movement after position sensing contacts T1 are opened, means are provided for bridging such contacts. In other words, means are provided for effectively "sealing in" the circuit of contacts T1 so that voltage continues to be applied to the relay CW. This is accomplished, in accordance with the invention, by special sealing contacts CW6 on the relay CW, which contacts are shown at the upper right-hand portion of FIG. 12a. The contacts CW6 provide a direct connection from line L1 to contacts M14-2 so that the turret moves continuously and uninterruptedly through the "intervening" stations 2 and 3. This is to be contrasted with conventional turret indexing systems in which the turret is required to stop and restart at each of the intervening stations which not only takes additional time but which produces an undesired jerkiness in the turret movement.

In accordance with one of the important aspects of the present invention the position sensing contacts not only provide a source of voltage for energizing the turret relay, but the contacts are connected in disabling relation to the corresponding selector relay so that when the turret moves a selected station into active position the relay is effectively deenergized to produce drop out of the motor relay, thereby to stop further movement of the turret. Specifically, we prefer to connect each of the position sensing switches in T1–T8 in parallel or shunting relation to the corresponding selector relay. It will be noted, for example, that the switch T4 is effectively connected in short circuiting relation to the corresponding relay M14. Thus, when the turret, continuing its rotation, arrives at a position in which station 4 is active, and which condition is illustrated in FIG. 15b, the relay M14 drops out, which has a number of effects. In the first place the contacts M14-1 are opened to remove voltage from the line 14M. Contacts 14-2 are also opened which cuts off the flow of current to the relay CW. This opens contacts CW1–CW3 (FIG. 14), deenergizing the armature 137. In addition, closure of contacts CW4 sets the brake 139 to prevent overtravel of the turret beyond the selected position. Lamp S4 is turned off and lamp A4 turns on indicating that the fourth station is now active. Finally, contacts CW5 reclose and contacts CW6 reopen to place the circuit in readiness for receipt of new instructions.

In further understanding the circuit, let it next be assumed that station 4 is in active position and that it is desired to select station 2. With switch T4 closed voltage is applied to bus 180. This energizes lines 181–183 which lead to "CC" contacts M11-3 to M13-3 as well as energizing the lines 185–188 which to "CW" contacts M15-2 to M18-2. This predisposes the turret to rotate either clockwise or counterclockwise depending upon which new station is selected. Upon selection of station 2, voltage is applied to selector line 12M (FIG. 13). This energizes the selector relay M12. Closure of contacts M12-1 seals in the selector circuit. Closure of contacts M12-2 occurs idly since line 172 is not energized. However, closure of contacts M12-3 is effective to feed voltage from the energized line 182 to the turret relay CC which produces counterclockwise turret rotation. Similarly, to the previous example, closure of contacts CC1-CC3 rotates the armature 137 in the appropriate direction with clutch engaged while opening of contacts CC4 releases the brake to permit the turret to move. Closure of contacts CC6 bridges, or seals in, the circuit of position sensing contacts T2. Thus movement of the turret occurs in the counterclockwise direction smoothly through the intervening station 3 until station 2 reaches the active position. At this point closure of position sensing contacts T2 effectively short circuits the selector relay M12 causing drop-out and opening of the relay contacts. Opening of contacts M12-1 breaks the circuit to the turret relay CC which opens contacts CC1-3 to stop the motor, closes contacts CC4 to set the brake, and restores contacts CC5 and CC6 to their initial condition in readiness for a new instruction. The lamp S2 is turned off and the lamp A2, by reason of closure of contacts T2, is turned on indicating that it is station 2 which is in active position.

With the above in mind there is no necessity for repeating the sequence description in accordance with the example set forth in FIGS. 15c and 15d, with station 6 as the new selected station. Having in mind that station 6 is diametrically opposite, and hence equidistant from, station 2 it will be recalled that the condition of equal distance is resolved by rotation in the clockwise direction. It will suffice to say that with switch T2 closed voltage is applied to line 186, and with station 6 selected, selector relay M16 operates to cause closure of relay contacts M16-2 which completes an active circuit to the relay CW producing clockwise movement of the turret. Because of the sealing effect of contacts CW6 movement occurs smoothly and uninterruptedly in the clockwise direction through all of the intervening stations until closure of position sensing relay T6 causes station 6 to be deposited in the active position as shown in FIG. 15d.

In accordance with one of the aspects of the invention a shot pin of "tapered" configuration is provided for engaging and registering with the turret when the turret is deposited by the turret motor in a nominal active position, the shot pin serving to "crowd" the turret slightly in one direction or the other so that the turret station is in a precise reference position with respect to the work. Further in accordance with the invention a power actuator is provided acting against a "return" spring which produces the useful thrust and for holding the shot pin in its retracted position as long as the turret motor is energized and for releasing the shot pin for movement into a receiving notch on the turret when the motor is stopped. Means are, moreover, provided for insuring that the motor is incapable of moving unless and until the shot pin is in its retracted position. Thus, referring to FIGS. 4, 5 and 14, the shot pin indicated at 190 is mounted on the frame for movement between a pair of guide members 191. At each of the turret stations there is a notch or receptacle 192 for receiving the pin. For retracting the pin a pneumatic actuator 193 is provided under the control of a solenoid valve 194 having a spring 195. The winding 196 for valve 194 is fed by contacts CRR-1 of a relay CRR (see FIG. 12a) which is effectively connected in parallel with the motor operating relays CW and CC, the latter, however, being respectively isolated from one another by isolating diodes 197.

For the purpose of signalling to the control circuit that the shot pin is retracted and thus ready for movement of the turret, a shot pin sensing switch 200 (FIG. 14) is provided having an "engaged" contact 201 and an "out" contact 202. The "out" contact controls a relay CRO which has contacts CRO-1 (FIG. 12a) through which the turret relay circuit completed to line L2. This insures that the relay motor cannot turn in either direction until the shot pin 190 has been withdrawn clear of the turret.

In a typical cycle, and with a turret station in active position, the turret will be positively positioned (see foot of FIG. 14). Under such conditions the contact 192 is open, which deenergizes the relay CRO and opens the contacts CRO-1 to disable the turret motor relays CW and CC. However, when a new station is selected which causes voltage to be furnished to the left-hand side of either relay CW or CC, the relay CRR is energized, closing contacts CRR-1 and energizing the solenoid valve 194 to admit air to the actuator 193 to withdraw the shot pin against the restoring force of the spring 195. This closes contact 202. energizing the relay CRO which competes the motor relay circuit so that the appropriate one of the relays, either CW or CC, may operate to drive the turret motor in the desired direction.

When the selected turret station moves into active position dropping out the selector relay, this not only turns off the turret motor but it also deenergizes the relay CRR, turning off the solenoid valve 194 and permitting air to escape from the actuator so that the pin 190 is shot into place under the urging of the spring. The wedged surfaces are sufficiently shallow and the spring is sufficiently strong so that the turret is crowded either in one direction or the other into a final and precisely indexed position. There is a notch on the turret corresponding to each turret station so that the same action occurs regardless of the turret station which is selected.

Finally, means are provided for insuring that the spindle drive gear 50 (FIG. 10) is withdrawn axially from the spindle before any turret movement takes place. This is accomplished by the actuator 56 controlled by a valve 204 having a solenoid winding 205, with the spring 57 serving to urge the drive gear 50 into its engaged position.

It will be apparent that the above described turret system amply fulfills the objects earlier set forth. It permits a plurality of operations to be performed upon a workpiece in quick succession with minimum lost time and a high degree of accuracy and safety. Where the device is computer controlled it will be apparent that automatic means may be used, within the skill of the art, to position the table upon which the workpiece is mounted (FIG. 1) at any desired coordinate position, and for controlling the height of the turret, thereby permitting automation of the entire machining procedure.

The term "chuck" used herein covers any means for releaseably gripping a tool for rotation by the spindle. The term "relay" or "relay means" is intended to denote a switching device having an input circuit which controls the continuity of an output circuit and includes devices of the solid state type. Thus the term "contacts" refers generally to the means for closing the output circuit.

What is claimed is:

1. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a spindle drive motor on the frame, a drive shaft extending within the frame, said drive shaft being coupled to the drive motor and having an engageable drive connection defining an active turret position, means including a reversible turret motor coupled to the turret to bring any selected one of the spindle assemblies into the active position for engagement of the drive and driven connection, position sensing contacts associated with each turret station and operated by the turret upon movement of the associated turret stations into active position, selector contacts operable to select a desired new turret station, and means including a logic matrix forming a circuit including the contacts and the turret motor for causing energization of the turret motor in a direction to rotate the turret clockwise for any selected station which lies to the right of the active position and counterclockwise for any selected station which lies to the left of the active position, the position sensing contacts being connected to deenergize the turret motor when the selected turret station reaches the active position.

2. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a drive motor on the frame, a drive shaft extending within the frame, said drive shaft being coupled to the drive motor and having an engageable drive connection defining an active turret position, means including a reversible turret motor coupled to the turret to bring any selected one of the spindle assemblies into the active position for engagement of the drive connection with the driven connection, position sensing contacts operated at each turret station upon movement of the respective turret station into active position, selector contacts operable to select a desired new turret station, means including a logic matrix forming a circuit including the contacts and the turret motor for initiating energization of the turret motor in a direction to rotate the turret clockwise for any selected station which lies to the right of the active position and counterclockwise for any selected station which lies to the left of the active position, and means operated incident to the motion for sealing in the turret motor circuit so that the motion of the turret continues smoothly and without interruption as the intervening stations pass through active position and until the selected station reaches the active position, the position sensing contacts being connected to deenergize the turret motor when the selected turret station moves into active position.

3. A turret system for a machine tool comprising, in combination, a frame, means for relatively positioning the frame with respect to a workpiece, a turret, means for mounting the turret in the frame for rotation with respect to an active machining position, a plurality of spindle assemblies radially mounted in the turret at respective spaced turret stations, each of the spindle assemblies including a rotatably mounted spindle having a chuck for engaging a tool at its outer end, a spindle drive motor, means for coupling the drive motor to the spindle which is in active machining position, means including a turret motor having controllably associated forward and reverse relay means and coupled to the turret to bring any selected one of the spindle assemblies into the active position, position sensing contacts associated with each turret station and operated by the turret upon movement of the associated turret station into active position, selector contacts operable to select a desired new turret station, means including a logic matrix forming a circuit which includes the contacts and the forward and reverse relay means for causing energization of the relay means to rotate the turret (a) clockwise to activate any selected station which lies to the right of the active position and (b) counterclockwise to activate any selected station which lies to the left of the active position, the forward and reverse relay means including contacts for sealing the circuit of the position sensing contacts to produce continuous driving of the turret for uninterrupted traverse of any intervening stations past the active machining position, the position sensing contacts being so connected as to effect drop out of the turret motor relay means to turn off the turret motor when the selected station reaches the active position.

4. A turret system for a machine tool comprising, in combination, a frame, means for relatively positioning the frame with respect to a workpiece, a turret, means for mounting the turret in the frame for rotation with respect to an active machining position, a plurality of spindle assemblies radially mounted in the turret at respective spaced turret stations, each of the spindle assemblies including a rotatably mounted spindle having a chuck for engaging a tool at its outer end, a spindle drive motor, means for coupling the drive motor to the spindle which is in active machining position, means including a turret motor having controllably associated forward and reverse relay means and coupled to the turret to bring any selected one of the spindle assemblies into the active position, position sensing contacts associated with each turret station and operated by the turret upon movement of the associated turret station into active position, selector contacts operable to select a desired new turret station, selector relays having relay contacts and having coils connected to the selector contacts, means including a logic matrix forming a circuit which includes the position sensing contacts and the relay contacts for causing energization of the relay means to rotate the turret (a) clockwise to activate any selected station which lies to the right of the active position and (b) counterclockwise to active any selected station which lies to the left of the active position, the forward and reverse relay means including contacts for sealing the circuit of the position sensing contacts to produce continuous driving of the turret for uninterrupted traverse of any intervening stations past the active machining position, the position sensing contacts being disablingly connected in parallel with the respective selector relays so as to produce drop-out of the turret motor relay means to turn off the turret motor when the selected station reaches the active position.

5. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a drive motor on the frame, a drive shaft extending within the frame, said drive shaft being coupled to the motor and having an engageable drive connection defining an active turret position, means including a reversible turret motor coupled to the turret to bring any selected one of the spindle assemblies into the active position for engagement of the drive connection with the driven connection, position sensing contacts associated with each turret station and closed by the turret as the associated turret station moves into active position, selector contacts operable to select a desired new turret station, selector relays having inputs respectively connected to the selector contacts and having selector relay contacts, and means including a logic matrix interposed in the circuit of the position sensing contacts and relay contacts for causing energization of the turret motor in a direction to rotate the selected turret station in the shortest path to the active position, the position sensing contacts being connected disablingly with the corresponding relays so that the turret motor is deenergized when the selected turret station reaches the active position.

6. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven pinion at its inner end, a drive motor on the frame, a drive shaft extending within the frame, said drive shaft being coupled to the motor and having a shiftable drive gear defining an active turret position, means including a reversible turret motor coupled to the turret to bring any selected one of the spindle assemblies into active position, means for shifting of the shiftable gear into mesh with the driven pinion, position sensing contacts associated with each turret station and arranged for closure by the turret as the associated turret station moves into active position, selector contacts closeable to select a desired new turret station, relays having coils respectively connected to the selector contacts and having selector relay contacts, and means including a logic matrix interposed in the circuit of the selector contacts and relay contacts for causing energization of the turret motor in a direction to rotate the selected turret station in the shortest path to the active position, the position sensing contacts being in parallel with the corresponding relay coil so that when the position sensing contact is closed the corresponding relay coil is short circuited thereby opening its associated contacts and causing the turret motor to be deenergized.

7. A turret system for a machine tool comprising, in combination, a frame, means for bodily positioning the frame along axes of movement, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven pinion at its inner end, a drive motor on the frame, a drive shaft extending within the frame, said drive shaft being coupled to the motor and having a shiftable gear defining an active turret position, means including a reversible turret motor having clockwise and counterclockwise controllers to bring any selected one of the spindle assemblies into active position, means for shifting of the shiftable gear into mesh with the driven pinion, position sensing contacts associated with each turret station and arranged for closure by the turret as the associated turret station moves into active position, selector contacts operable to select a desired new turret station, relays having inputs respectively connected to the selector contacts and having a double set of relay contacts, one contact of each relay being connected to the clockwise motor controller and the other contact of each relay being connected to the counterclockwise motor controller, and means including a logic matrix interposed in the circuit of the position sensing contacts and the relay contacts for energizing the appropriate one of the controllers to cause energization of the turret motor in a direction to rotate the turret in the shortest path to the selected new position, the position sensing contacts being disablingly connected to the corresponding relays so that when the selected new position of the turret is reached the turret motor is deenergized.

8. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a drive motor on the frame, a drive shaft extending within the frame, said drive shaft being coupled to the motor and having a relatively shiftable drive connection defining an active turret position, means including a reversible turret motor connected to the turret to bring any selected one of the spindle assemblies into active position, means for shifting of the drive connection into engagement with the driven connection, a position sensor associated with each turret station and operated by the turret as the associated station is moved into active position, means including a selector switch for selecting a desired new station, means including a logic matrix connected to the position sensors and to the selector switch for energizing the turret motor in a direction to rotate the selected station in the shortest path to active position, and means responsive to the position sensors for turning off the turret motor when the selected station reaches the active position.

9. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a drive motor on the frame, a drive shaft extending within the frame, said drive shaft being coupled to the motor and having a relatively shiftable drive connection defining an active turret position, means including a reversible turret motor connected to the turret to bring any selected one of the spindle assemblies into active position, means for shifting of the drive connection into engagement with the driven connection, a position sensor associated with each turret station and operated by the turret as the associated station moves into active position, means including a selector switch for selecting a desired new station, means including a logic matrix connected to the position sensors and to the selector switch for energizing the turret motor in a direction to rotate the selected station in the shortest path to active position, means for sealing in the turret motor circuit to produce continuous driving of the turret for uninterrupted passage of the intervening stations through the active position, and means responsive to the position sensors for turning off the turret motor when the selected station reaches the active position.

10. A turret system for a machine tool comprising, in combination, a frame, means for relatively positioning the frame with respect to a workpiece, a turret, means for rotatably mounting the turret in the frame, a plurality of spindle assemblies radially mounted in the turret at spaced turret stations, each of the spindle assemblies including a rotatably mounted spindle having a chuck for engaging a tool at its outer end and having a driven connection at its inner end, a drive motor on the frame, a drive shaft extending within the frame, said drive shaft being coupled to the motor and having a relatively shiftable drive connection defining an active turret position, means including a reversible turret motor connected to the turret to bring any selected one of the spindle assemblies into active position, means for shifting of the drive connection into engagement with the driven connection, a position sensor associated with each turret station and operated by the turret as the associated station moves into active position, means including a selector switch for selecting a desired new station, means including a logic matrix connected to the position sensors and to the selector switch for energizing the turret motor in a direction to rotate the selected station in the shortest path to active position, means for sustaining the energization of the turret motor so that the intervening stations continuously and uninterruptedly move through active position, means responsive to the position sensors for turning off the turret motor when the selected station reaches the active position, and means including a shot pin engaged incident to arrival of the selected station at the reference position for precisely locating the selected station at the reference position.

11. A turret system for a machine tool comprising, in combination, a hollow frame, means for relatively positioning the frame with respect to a workpiece, a turret, means for rotatably mounting the turret in the frame, a plurality of spindle assemblies radially mounted in the turret at respective turret stations, each of the spindle assemblies being comprised of a cylindrical sleeve and a hollow spindle rotatably mounted in the sleeve, the spindle having a chuck for engaging a tool at its outer end and having a driven pinion at its inner end, the turret having registering cylindrical openings for receiving the spindle assemblies, a drive motor, a drive shaft extending within the frame, the drive shaft being coupled to the motor and having a drive gear defining an active turret position, means for rotating the turret to bring any selected one of the spindle assemblies into active position for meshing of the driven pinion with the drive gear, and power actuated means on the frame located at a reference position integrally related to the active position for operating the chuck of the spindle assembly at the reference position for substitution of a different tool therein.

12. A turret system for a machine tool comprising, in combination, a hollow frame, means for relatively positioning the frame with respect to a workpiece, a turret, means for rotatably mounting the turret in the frame, a plurality of spindle assemblies radially mounted in the turret at respective turret stations, each of the spindle assemblies having a hollow spindle, the spindles each having a chuck for engaging a tool at its outer end and having a driven pinion at its inner end, a drive motor, a drive shaft extending within the frame, said drive shaft being coupled to the motor and having a shiftable drive gear defining an active turret position, means for rotating the turret to bring any selected one of the spindle assemblies into active position, means for shifting of the drive gear into mesh with the driven pinion, a chuck including a pull rod having means at its outer end for engaging a tool and having an associated spring for drawing the tool inwardly into seated position, the end of the pull rod being exposed at the inner end of the spindle, and a power actuator in the frame located at a reference tool-changing position integrally related to the active position for pushing against the pull rod of the spindle assembly for substitution of a different tool therein.

13. The combination as claimed in claim 12 in which the pull rod is formed of inner and outer telescoping sections normally latched together but spring biased apart and so constructed that the latch is automatically released when the pull rod is acted upon by the actuator so that the outer section pops outwardly of the chuck to facilitate manual release of the tool.

14. The combination as claimed in claim 13 in which the spindle has a key for rotatably engaging the tool and in which the outer section of the pull rod is threaded for screwing into the tool, the popping out of the outer section of the pull rod serving to release the tool axially from the key so that the tool may be unscrewed from the pull rod.

15. In a turret system for a machine tool comprising, in combination, a hollow frame, means for bodily positioning the frame, a turret, means for rotatably mounting the turret in the frame, a plurality of spindle assemblies radially mounted in the turret at respective turret stations, each of the spindle assemblies being comprised of a cylindrical sleeve and a hollow spindle rotatably mounted in the sleeve, the spindle having a chuck for engaging a tool at its outer end and having a driven pinion at its inner end, the turret having registering cylindrical openings for registered reception of the spindle assemblies, a drive motor on the frame, a drive shaft extending within the frame, said drive shaft being coupled to the motor and having a shiftable drive gear defining an active turret position, means for rotating the turret to bring any selected one of the spindle assemblies into active position, means for shifting of the shiftable gear into mesh with the drive pinion, means for releasably sealing the sleeves in the respective openings, the driven pinions having a diameter less than the diameter of the cylindrical openings in the frame for endwise bodily removal and insertion of a spindle assembly, and means in the frame located at the active position for conducting lubricant to the spindle assembly in active position.

16. The combination as claimed in claim 15 in which each of the spindle assemblies has a lubricant supply line extending radially inward from the turret toward the turret axis and in which a distribution post is provided on the frame having an outlet alined with the active position for communicating lubricant to the spindle assembly which is in active position.

17. The combination as claimed in claim 15 in which an actuator is provided for shifting the shiftable gear and in which the actuator has resilient means for nonpositive shifting so that in the event the shiftable gear and the pinion on the spindle are in initial interfering relationship meshing will occur upon initial rotation of the shiftable gear.

18. The combination as claimed in claim 17 in which the frame includes a cross shaft coupled to the motor and having a drive pinion engaging the shiftable gear, the drive pinion being of greater length than the pinion on the spindle so that the drive pinion remains in mesh with the shiftable gear within the range of movement of the latter.

19. The combination as claimed in claim 11 in which a gear shift is interposed between the motor and the drive shaft to permit driving the spindle which is in reference position at a selected one of a plurality of speeds.

20. The combination as claimed in claim 11 in which means including a separate turret motor are provided for rotating the turret, the motor having an associated brake which is set during those times that the motor is not energized for the purpose of (a) rotating the turret to a position in which a selected tool is in active position and (b) subsequently setting the brake so that the turret is clamped in selected position, and means including a locator key and receptacle interposed between the frame and the turret, the key and receptacle being formed to provide lateral camming action as the key enters the receptacle with sufficient force so as to overcome the friction of the brake thereby to force the turret to move from a nominal active position to a final position in which the selected spindle is positioned with precision.

* * * * *